Dec. 13, 1960  L. L. DEAL  2,963,843
GATHERING MEANS FOR A CORN PICKER
Filed Sept. 18, 1958

INVENTOR.
BY N. Vincent Harsha
ATTORNEY

United States Patent Office 2,963,843
Patented Dec. 13, 1960

2,963,843

GATHERING MEANS FOR A CORN PICKER

Lynn L. Deal, R.F.D. 4, Jefferson, Iowa

Filed Sept. 18, 1958, Ser. No. 761,864

7 Claims. (Cl. 56—119)

This invention relates generally to corn picking machines, and more particularly to improvements in corn picker gathering point mounting attitude and configuration.

In corn picking machines presently known in the art, the gathering points are arranged to form a generally V-shaped entrance into which the stalk rows are directed. Such gathering point configurations function to urge the stalks in a row into proper alignment with snapping rollers of the picking mechanism in a well known manner. In the case of leaning stalks or "downed corn," the gathering members currently in use have not been completely successful in urging the irregular stalks into proper position for presentation to the snapping rollers as the gathering points pass astride the stalk rows. It is an object of the present invention, therefore, to provide an improved gathering point arrangement of more efficient configuration and with improved mounting attitude with respect to the stalk rows by which a marked improvement in stalk pickup efficiency may be realized.

It is a further object of the present invention to provide a new and novel corn picker gathering point configuration wherein specific gathering point surface contours and gathering point mounting positions with respect to stalk rows enable an increased efficiency in the gathering of irregular stalks in the leaning or downed position.

The invention is featured in the provision of specifically concave gathering point surface configurations wherein each pair of gathering points associated with a particular stalk row are toed inwardly toward one another to form a diverging-converging stalk engaging surface pair rather than the generally converging convex gathering point configurations in general usage.

These and other objects and features of the present invention will become apparent upon reading the following description in conjunction with the accompanying drawings, in which.

An important determining factor in the over-all efficiency of mechanical corn pickers lies in the proper presentation of the stalks to the snapping rollers as the gathering point pairs pass astride the stalk row. In stalk gathering arrangements currently in use, the stalk row is presented with a generally converging pair of gathering point members, generally V-shaped, by which stalks are to be urged so as to be concentrated at the apex of the gathering "wedge" in alignment with the snapping rollers. Such arrangements, while serving to generally concentrate upright stalks into proper husking position, have not been completely successful in gathering irregular stalks in a row which may be leaning or "downed" transverse to the row line. I have found that a marked increase in picking efficiency may be realized by a new concept in the contour and alignment of each pair of gathering points. This increased efficiency, as realized by the present invention, results from a new and unique gathering effect which stems from "toeing" inwardly each pair of gathering points to form a diverging arrangement rather than the converging wedge-like configurations commonly employed, and further by shaping the stalk-engaging inner surfaces of each pair of gathering points with cooperative concave contours which result in more successful uprighting of irregular stalks as the gathering points pass astride the stalk rows. The gathering point configurations of the present invention, as will be further described in detail, more efficiently urge irregular stalks into proper alignment with the snapping roller axes.

Figure 1:
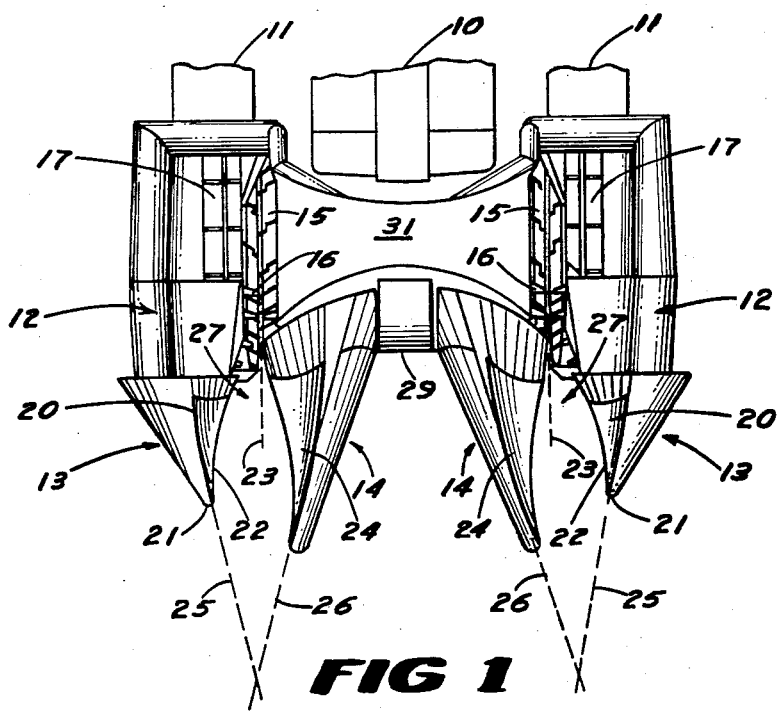
Figure 1 illustrates a top view of a tractor-mounted corn picker specifically illustrating the gathering point mounting attitudes and configurations according to the present invention.

Figure 1 of the drawings illustrates gathering point configurations according to the present invention as incorporated with a conventional tractor mounted two-row mechanical corn picker. A top partial view is illustrated wherein only the radiator portion of the tractor 10 is included. A pair of gathering plate members 12 are mounted on either side of the tractor 10 so as to be in receiving position for a pair of planter stalk rows. Each of the gathering plate members 12 is associated with a pair of gathering points generally designated by reference numerals 13 and 14. Each of the gathering point pairs provides a gathering and stalk alignment means for a row of corn. Associated rearwardly of each of the gathering points 13 and 14 are snapping rollers 15, gathering chains 16, and ear elevators 17 with elevator housings 11 in a conventional mechanical corn picker arrangement devised to remove ears from stalks in a well known manner which need not be described in detail here. The picking function per se is conventional and may be any of known arrangements in the art. Each gathering point pair 13—14 is mounted on a frame member (not shown) which is adapted to be conventionally raised and lowered with respect to the tractor 10.

Now considering the gathering points 13 and 14, outer plate 13 is seen to be formed with an inner, stalk-engaging surface 22 which is formed as a doubly concave contour. Surface 22 is concavely contoured from the toe 21 rearwardly and also from the underside 22 upwardly. The longitudinal axes 25 of the gathering points 13 are seen to each toe inwardly toward the snapping roller axes 23. Similarly, the inside stalk facing surfaces 24 of the inner gathering points 14 are formed with a doubly concave contour and the longitudinal axes 26 of the inner gathering points 14 are toed inwardly toward the snapping roller axes 23 such that the extended gathering point axes 25 and 26 intersect forward of the tips of the points.

As the gathering point pairs 13—14 pass astride the stalk rows, each stalk is simultaneously urged upwardly and inwardly toward the apex 27 and into ultimate proper position with respect to the snapping roller axes 23. Irregular leaning or "downed" stalks are thus more efficiently urged into the desired picking position in a smooth manner so as to reduce loss of ears through violent contact of the stalk with the gathering point configurations. Stalks leaning sideways with respect to the rows are urged uprightly by action of the concave gathering point surfaces 20 and 24 and subsequently into line with the axes 23 of the snapping rollers and gathering chains 15 and 16. Surfaces 22 and 24 may have different contours and function within the invention. Actual tests have been made with surfaces 20 and 24 having different contours from those shown and the invention improved the picking characteristics of prior pickers. By this improved arrangement, loss of yield due to leaning and downed stalks is minimized. A mechanical corn picker with gathering points according to the present invention has been successfully operated with a marked decrease in missed ears as compared to those incorporating known gathering point arrangements.

Figure 2:
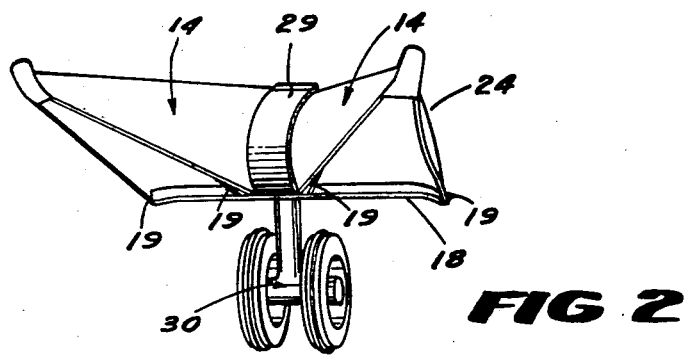
Figure 2 is an isometric view of the inner gathering points in raised position along with a centrally mounted anti-clog baffle plate member according to the present invention.

With reference to Figure 2, the inner gathering points 14 are illustrated in raised position and are affixed to a mounting bar 18 by means of pins or other securing means 19. A deflecting plate member 29 is mounted intermediate the two gathering points 14 to serve as an anti-clog device. Plate 29 is seen to extend upwardly from mounting bar 18 in a curved manner to conform to the rear terminating configuration of the gathering points and serves to prevent debris intermediate the stalk rows from passing between and under the gathering points where it might become tangled in the front wheels 30 of the tractor. Plate 29, in being so placed and formed, serves to urge such debris or downed ears and/or stalks upwardly against the front radiator baffle shield 31 (Figure 1) and thus into ultimate contact with the snapping rollers 15.

It is thus seen that the gathering point arrangement of the present invention provides a new and novel gathering effect by which stalks are smoothly and efficiently urged into proper alignment and position for picking.

Although the invention has been described in conjunction with a two-row tractor mounted embodiment, it is not to be so limited, as changes might be made therein which are within the full intended scope of the invention as defined by the appended claims.

I claim:

1. In a corn picking machine of the type including stalk gathering means spaced forwardly of and communicating with snapping and stripping devices, means for gathering stalks for presentation to said snapping and stripping devices comprising a pair of gathering points adapted to pass astride a stalk row, each of said pair of gathering points formed to present a stalk engaging inner-surface configuration to a stalk row, said inner surfaces angled generally inwardly toward one another whereby projections of the longitudinal axes of each of said gathering points intersect forwardly of the leading edge of each said gathering point.

2. A corn picking machine comprising stalk gathering means associated with snapping rollers, a pair of space separated gathering points forwardly terminating said stalk gathering means, said pair of gathering points being of generally split conical configuration with a generally pointed leading edge, each of said pair of gathering points formed with inner stalk engaging surfaces concavely contoured along an incline and downwardly toward a stalk row, and each said gathering point angled inwardly toward the stalk row axis such that the longitudinal axes of said pair of gathering points intersect forwardly of the leading extremities thereof.

3. A corn picking machine comprising stalk gathering means associated with snapping means, a pair of space separated stalk encompassing gathering points forwardly terminating said gathering means, each of said pair of gathering points formed with inwardly and downwardly inclined stalk engaging surfaces, each of said surfaces concavely contoured from the tip of the point rearwardly, and each gathering point angled inwardly such that the longitudinal axes of said gathering points intersect forward of the leading extremities thereof.

4. A corn picking machine comprising stalk gathering means associated with snapping means, a pair of space separated stalk encompassing gathering points forwardly terminating said gathering means, each of said pair of gathering points formed with a concavely contoured and inwardly and downwardly inclined stalk facing surface, each said surface additionally formed with a concave contour extending longitudinally from the tip thereof rearwardly, and each said gathering point angled inwardly such that the longitudinal axes of said gathering points intersect forward of the leading extremities thereof.

5. In combination with a corn picking machine comprising stalk gathering means associated with snapping means, a pair of space separated stalk encompassing gathering points forwardly terminating said gathering means, the opposed stalk engaging surfaces of said pair of gathering points concavely contoured inwardly and downwardly, each said surface additionally formed with a concave contour extending from the tip thereof rearwardly, and each said gathering point angled generally inwardly such that the longitudinal axes thereof intersect forward of the tips thereon, whereby stalks are encompassed by an initially diverging and finally converging opposed plate surface configuration as the pair of gathering points pass astride a stalk row.

6. A corn picking machine comprising stalk gathering means associated with snapping roller means, a pair of space separated stalk encompassing gathering points forwardly terminating said gathering means, each one of said pair of gathering points formed with concavely contoured inwardly and downwardly inclined stalk engaging surfaces, each said surface additionally formed with a concave contour extending longitudinally from the tip rearwardly, each said gathering point pair angled inwardly such that the longitudinal axes thereof intersect forward of the leading extremities thereof, the inner gathering points of each pair presenting a generally wedge shaped converging opposed surface configuration intermediate the longitudinal axes of said snapping rollers, said configuration having a deflecting plate member mounted at the apex thereof and curving upwardly and rearwardly from the bottoms of said inner gathering points, whereby debris between stalk rows is ultimately urged into said snapping roller means.

7. A corn picking machine comprising stalk gathering means associated with snapping rollers, a pair of space separated gathering points forwardly terminating said stalk gathering means, said pair of gathering points being of generally split conical configuration with a generally pointed leading edge, and each said gathering point angled inwardly toward the stalk row axis such that the longitudinal axes of said pair of gathering points intersect forwardly of the leading extremities thereof.

References Cited in the file of this patent
UNITED STATES PATENTS

| | | |
|---|---|---|
| 2,133,217 | Thornton | Oct. 11, 1938 |
| 2,133,905 | Rund | Oct. 18, 1938 |
| 2,648,941 | Hintz | Aug. 18, 1953 |